Feb. 28, 1939.   F. O. AGEL   2,148,793
PROCESS FOR THE PRODUCTION OF NITRATES
Filed Jan. 24, 1936
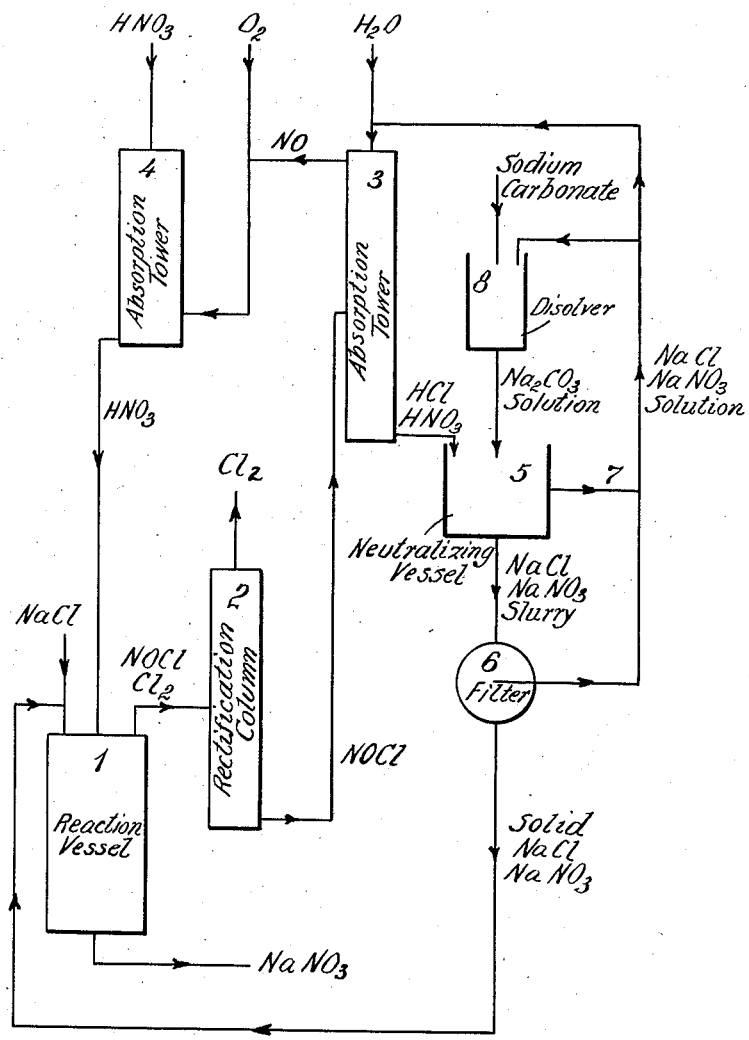
INVENTOR
FRANK OSCAR AGEL
BY
ATTORNEY Patented Feb. 28, 1939

2,148,793

UNITED STATES PATENT OFFICE 2,148,793

PROCESS FOR THE PRODUCTION OF NITRATES

Frank Oscar Agel, Petersburg, Va., assignor to The Solvay Process Company, New York, N. Y., a corporation of New York Application January 24, 1936, Serial No. 60,546

23 Claims. (Cl. 23—102)

This invention relates to a process for the treatment of nitrosyl chloride to decompose it and to recover its nitrogen content as an oxide of nitrogen and its chlorine content as a chloride, either hydrogen chloride or a chloride salt. The invention more particularly relates to the production of a nitrate by reaction of a metal chloride with nitric acid and to the treatment of the mixture of chlorine and nitrosyl chloride formed by this reaction to recover as chlorine gas the chlorine combined as nitrosyl chloride as well as the free chlorine evolved by the reaction of the salt and acid and to recover as an oxide of nitrogen and nitric acid the nitrogen combined in the nitrosyl chloride.

It is known that nitric acid and a metal chloride, for example an alkali metal chloride such as sodium or potassium chloride, or an alkaline earth metal chloride such as calcium chloride, may be reacted with nitric acid to form the corresponding nitrate and evolve a gas mixture containing nitrosyl chloride and chlorine. By separating the chlorine from the nitrosyl chloride about two-thirds of the chlorine originally combined in the chloride salt may be recovered as a chlorine gas. The remaining one-third of the chlorine is in combination with the corresponding quantity of fixed nitrogen as nitrosyl chloride.

It is an object of this invention to provide a process whereby a metal chloride may be reacted with nitric acid and the resulting mixture of chlorine and nitrosyl chloride may be treated to separately recover both free and combined chlorine and nitrogen and to obtain as free chlorine gas and as a nitrate substantially all of the chlorine and metal originally combined in the metal chloride.

It is a further object of this invention to provide a method for the economical treatment of nitrosyl chloride to decompose it and separately recover its fixed nitrogen and chlorine content. Other objects of the invention will appear hereinafter.

In treating nitrosyl chloride in accordance with this invention an aqueous liquor is repeatedly circulated through two stages. In one stage the liquor is intimately contacted with the nitrosyl chloride to decompose it with the production of nitric oxide. The liquor at the point at which the nitrosyl chloride is last contacted therewith or, in the preferred procedure in which the liquid and nitrosyl chloride are passed in countercurrent flow with each other, at the point at which the liquor is introduced into contact with the nitrosyl chloride gas, may be alkaline or acid in reaction but in employing an acid liquor it preferably contains an amount of acid in proportion to the amount of water present not in excess of that corresponding to a 3-N acid solution. The liquor is contacted with the nitrosyl chloride in amount sufficient to substantially completely decompose the nitrosyl chloride with the formation of a solution containing nitric and hydrochloric acids in which the proportion of acid and water is not in excess of that corresponding to a 6-N to 8-N acid solution, depending upon the temperature at which the nitrosyl chloride is treated. While this temperature may range from the freezing point to the boiling point of the liquor, it is preferred to operate at a temperature between about 30° C. to 80° C. For temperatures in the neighborhood of 80° C., it is preferred to supply the liquor in amount such that a solution corresponding to not more than a 6-N acid solution is obtained, while for lower temperatures in the neighborhood of 30° C., a smaller proportion of liquor to nitrosyl chloride may be employed, but the liquor should still be supplied in amount such that a solution corresponding to not more than an 8-N acid solution is obtained.

The solution formed in treating the nitrosyl chloride with the aqueous liquor is drawn from the nitrosyl chloride decomposition stage and passed through a second stage wherein a base is added to the liquor. The base, for example a hydroxide or carbonate of the alkali metals sodium and potassium or of the alkaline earth metals, for example, calcium, etc., reacts with nitric acid and hydrochloric acid present in the solution to form the corresponding nitrate and chloride. The base may be added in amount more than sufficient to neutralize the acids or insufficient for complete neutralization but in amount such that the acid in the treated solution is not in excess of that corresponding to a 3-N acid solution. The thus treated liquor containing the nitrate and chloride of an alkali metal, an alkaline earth metal, etc. is again contacted with nitrosyl chloride in the first of the above described stages.

In the preferred embodiment of the process of this invention, nitric acid is reacted with a metal salt to form a nitrate and a gas containing nitrosyl chloride and chlorine. The nitrosyl chloride is separated from the chlorine in the gas and is then treated with an aqueous liquor as described above. The aqueous liquor is in this case a concentrated aqueous solution of a metal chloride and nitrate, preferably a solution saturated at a temperature of about 30° C. to about 80° C. with respect to both the chloride and the nitrate which may carry suspended in it solid undissolved salts. This solution may be substantially neutral or it may contain acid up to that amount corresponding to a 3-N acid solution. The nitrosyl chloride reacts with the water to form hydrochloric and nitric acids with the evolution of nitric oxide. The solution of nitric and hydrochloric acids is then neutralized with a base to convert the acids into the corresponding chloride and a nitrate. The chloride contained in this solution is returned for treatment with nitric acid to form additional nitrate, nitrosyl chloride and chlorine, preferably by separating from the solution a mixture of solid chloride and nitrate and returning this mixture for treatment with the nitric acid. The nitric oxide evolved in treating the nitrosyl chloride with the liquor may be utilized, for example, by absorption in water or nitric acid solution in the presence of oxygen to form nitric acid which may serve to decompose additional chloride.

The invention will be more particularly described in conjunction with the process for the production of sodium nitrate which is illustrated in the accompanying drawing, although the invention is not limited to this particular process.

With reference to the drawing, the numeral 1 designates a reaction vessel to which sodium chloride and nitric acid are supplied, in which the reaction mixture of chloride and acid is heated, and from the bottom of which a solution of sodium nitrate is withdrawn. The nitrosyl chloride and chlorine gases evolved by the reaction in vessel 1 are passed to a rectification column 2 in which the nitrosyl chloride is liquefied and is separated from the chlorine gas. The chlorine gas escaping from the top of column 2 may be subjected to further purification treatment, if desired, and may then be liquefied to condense a liquid chlorine. Liquid nitrosyl chloride or gaseous nitrosyl chloride vaporized in the bottom of column 2, is withdrawn from the bottom of this column and is passed into the mid-portion of an absorption column 3. In column 3 the ascending gases are scrubbed by a downward flow of an aqueous solution of sodium chloride and sodium nitrate at a temperature of about 30° C. to 80° C. This solution is supplied to the top of column 3 as a substantially neutral liquor carrying solid sodium chloride and sodium nitrate suspended therein. The salt solution is supplied to the top of column 3 at such a rate that the ratio of acid to water in the solution withdrawn from the bottom of the column is maintained below about 2-N. The bottom of absorption column 3 may be provided with a heater, not shown in the drawing, to supply any additional heat desired over that evolved by the reaction of the nitrosyl chloride and water to heat the solution in the bottom of the column to a temperature sufficiently high to substantially free the solution of any NO dissolved therein, for example to a temperature of about 60° C. to 80° C.

The NO formed by reaction of the nitrosyl chloride and water is withdrawn from the top of column 3, is mixed with oxygen and is passed in contact with a dilute aqueous nitric acid solution in an absorption tower 4. The nitric oxide is oxidized and the resulting oxides of nitrogen are absorbed in the aqueous solution, reacting with the water to form nitric acid. The nitric acid is passed from absorption tower 4 to reaction vessel 1 for treatment with sodium chloride.

The solution of sodium chloride and sodium nitrate containing hydrochloric and nitric acids and solid sodium chloride and sodium nitrate, is withdrawn from the bottom of absorption column 3 and is introduced into a neutralizing vessel 5. A solution or slurry of sodium carbonate is also introduced into vessel 5 in amount sufficient to neutralize the acids forming sodium chloride and sodium nitrate. The carbon dioxide evolved by the reaction escapes from vessel 5. Vessel 5 is provided with a stirring means and a cooler, not shown in the drawing, whereby the sodium carbonate solution may be intimately mixed with the acid solution from column 3 and the neutralized solution cooled. Vessel 5 is also operated as a thickener, the crystals of sodium chloride and sodium nitrate falling to the bottom of the vessel whence, together with mother liquor, they are drawn to a filter 6. Mother liquor carrying in suspension some crystallized salts, is drawn from the neutralizing vessel through an overflow 7.

In filter 6 the mother liquor and salt crystals are separated. Mother liquor from filter 6, mixed with mother liquor from overflow 7, is passed into the top of absorption column 3 where it serves for the treatment of nitrosyl chloride. A part of this mother liquor, instead of passing to column 3, is introduced into a dissolver 8 where it is used to dissolve sodium carbonate to form the sodium carbonate solution or as a vehicle for carrying solid sodium carbonate which is used in neutralizing vessel 5. Instead of using a solution or slurry for neutralizing the acids in the solution in vessel 5, dry solid sodium carbonate may be introduced into the neutralizing vessel.

The mixture of salts (sodium chloride and sodium nitrate) recovered in filter 6 is introduced into reaction vessel 1 for treatment with nitric acid together with additional sodium chloride. By thus introducing sodium nitrate into the reaction vessel the efficiency of the reaction of the acid and sodium chloride is increased by the presence in the reaction mixture of a greater proportion of sodium nitrate than that formed by the reaction itself. The process illustrated in the drawing, therefore, represents a particularly effective procedure for the production of sodium nitrate and chlorine from sodium chloride and nitric acid. By separating the chlorine from the nitrosyl chloride and then decomposing the nitrosyl chloride, its combined nitrogen may be efficiently recovered in the form of nitric acid and of sodium nitrate, both of which may be returned for use in the production of additional chlorine and sodium nitrate. Finally, by returning to the acid-salt reaction mixture the chlorine recovered from the nitrosyl chloride as sodium chloride, all the chlorine of the salt supplied to the process is ultimately recovered as substantially pure chlorine which is separated from nitrosyl chloride in rectification column 2. This will be made clear by the following equations representing the several chemical reactions involved in carrying out the process of the drawing and their summation:

$$9NaCl + 12HNO_3 = 9NaNO_3 + 3NOCl + 3Cl_2 + 6H_2O$$
$$3NOCl + 2H_2O = 3HCl + HNO_3 + 2NO$$
$$2Na_2CO_3 + 3HCl + HNO_3 = 3NaCl + NaNO_3 + 2H_2O + 2CO_2$$
$$2NO + H_2O + 1\tfrac{1}{2}O_2 = 2HNO_3$$

$$6NaCl + 10HNO_3 + 2Na_2CO_3 + 1\tfrac{1}{2}O_2 = 10NaNO_3 + 3Cl_2 + 5H_2O + 2CO_2$$

It will be seen that column 3, vessel 5 and filter 6 with their connecting pipes, form a closed cyclic system in which an aqueous solution of sodium chloride and sodium nitrate is repeatedly circulated. From that system water is withdrawn as moisture adhering to the solid mixture of salts from filter 6 and as water vapor in the nitric oxide gas drawn from the top of absorption column 3. Water may be supplied to this system as, for example, with the mother liquor returned to the top of absorption column 3 to make up for the water withdrawn therefrom.

Numerous changes and modifications may be made in the above procedure and it is intended that the example described shall be considered as illustrative of the invention rather than the invention being limited thereto. Where the solid salts recovered from the solution obtained by neutralizing the hydrochloric and nitric acids are to be returned for reaction with additional nitric acid to form a nitrate, nitrosyl chloride and chlorine, it is preferred that the base used for the neutralization of the acids should be a basic compound of the same metal as that in the metal chloride reacted with the nitric acid in reaction vessel 1. For example, where sodium chloride is to be reacted with nitric acid to form sodium nitrate, a sodium base such as sodium carbonate or sodium hydroxide should be used for the neutralization of the acids in the solution in vessel 5. If calcium chloride is to be reacted with nitric acid to form calcium nitrate in vessel 1, calcium oxide, hydroxide or carbonate may be employed for neutralizing the acids in vessel 5. It is not necessary, however, to use for neutralizing the acids a base of the same metal as that of the chloride reacted in vessel 1. For example, ammonia may be introduced into neutralizing vessel 5 in which case a mixture of ammonium nitrate and ammonium chloride is recovered from filter 6 and may be sold for use as a fertilizer. Calcium carbonate may be employed in neutralizing vessel 5 and the mixture of calcium chloride and nitrate thus obtained returned for reaction in vessel 1. In this case the calcium chloride is converted into calcium nitrate and a product containing both calcium nitrate and sodium nitrate (formed from sodium chloride supplied to the vessel) is recovered from the solution leaving vessel 1. Any other desired mixture of chloride and nitrate salts may be recovered from filter 6 by using the appropriate base in neutralizing vessel 5.

In the above example the nitric oxide from the absorption column 3 is absorbed in the nitric acid to be used for reaction with the sodium chloride in vessel 1. While this is a preferred embodiment of the invention, the invention may be employed withdrawing the nitric oxide gas from the process for utilization in any desired manner.

I claim:

1. The process for the decomposition of nitrosyl chloride and the production of nitric oxide and solid salts therefrom which comprises introducing a gas containing said nitrosyl chloride and substantially free from chloride into contact with a concentrated aqueous solution of an inorganic nitrate and chloride to decompose the nitrosyl chloride forming hydrochloric and nitric acids which are dissolved in said aqueous solution and nitric oxide gas which is withdrawn from contact with said aqueous solution, reacting the acids in the solution with an inorganic base, thereby increasing the amount of nitrate and chloride in the solution, and recovering solid chloride and nitrate from the thus treated solution.

2. The process for the treatment of a gas containing nitrosyl chloride and chlorine which comprises first removing the chlorine from said gas, repeatedly circulating an aqueous liquor through a plurality of stages, first through one of said stages wherein said liquor containing a proportion of acid and water not in excess of that corresponding to a 3-N acid solution is introduced into contact with the nitrosyl chloride from which the chlorine has been separated and is intimately contacted in countercurrent flow therewith in amount sufficient to substantially completely decompose the nitrosyl chloride to form nitric oxide gas and nitric and hydrochloric acids, said nitric oxide gas being withdrawn from contact with said liquor and said nitric and hydrochloric acids being absorbed therein with the formation of a solution in which the proportion of acid and water is so correlated with the temperature at which the nitrosyl chloride and liquor are contacted that at about 80° C. the acidity of the resulting solution is not in excess of 6-N and at about 30° C. the acidity of the resulting solution is not in excess of 8-N, passing the resulting liquor through a second stage in which an inorganic basic material is added to the liquor to react with acid contained therein in amount such that the proportion of acid and water in the resulting solution is not in excess of that corresponding to a 3-N acid solution, recovering as solid salts chloride and nitrate thus formed, and recirculating liquor from said second stage containing dissolved chloride and nitrate into renewed contact with said nitrosyl chloride in the first mentioned stage.

3. The process for the treatment of a gas containing nitrosyl chloride and chlorine which comprises first removing the chlorine from said gas, circulating a concentrated aqueous solution of an inorganic chloride and nitrate in a cyclic system in which said solution is passed in contact with the nitrosyl chloride from which the chlorine has been separated to decompose the nitrosyl chloride forming nitric oxide gas which is withdrawn from contact with the solution and hydrochloric and nitric acids which are dissolved in the solution, reacting the acids in the solution with an inorganic basic compound of the same cation as that of the aforesaid chloride and nitrate, thereby increasing the amount of nitrate and chloride in the solution and causing solid nitrate and chloride to crystallize from the solution, separating the crystallized solid from the mother liquor and returning the mother liquor containing dissolved chloride and nitrate into contact with said nitrosyl chloride.

4. The process for the treatment of a gas containing nitrosyl chloride and chlorine which comprises first removing the chlorine from said gas, circulating an aqueous solution saturated at about 30° C. to about 80° C. with an inorganic chloride and nitrate in a cyclic system in which said solution is passed in contact with the nitrosyl chloride from which the chloride has been separated at a temperature of about 30° C. to about 80° C. in amount sufficient to substantially completely decompose the nitrosyl chloride with the production of a solution containing hydrochloric and nitric acids and water in a proportion so correlated with the temperature at which the nitrosyl chloride and liquor are contacted that at about 80° C. the acidity of the resulting solution is not in excess of 6-N and at about 30° C. the acidity of the resulting solution is not in excess of 8-N, and of nitric oxide gas which is withdrawn from contact with the solution reacting the acids in the solution with an inorganic basic compound of the same cation as that of the aforesaid chloride and nitrate, thereby increasing the amount of nitrate and chloride in the solution and causing solid nitrate and chloride to crystallize from the solution, separating the crystallized solid from the mother liquor and returning the mother liquor containing dissolved chloride and nitrate into contact with said nitrosyl chloride.

5. The process for the treatment of a gas containing nitrosyl chloride and chlorine which comprises first removing the chloride from said gas and then introducing the nitrosyl chloride from which the chlorine has been separated into contact with a concentrated aqueous solution of a nitrate and a chloride of an alkali metal to decompose the nitrosyl chloride forming hydrochloric and nitric acids which are dissolved in said aqueous solution and nitric oxide gas which is withdrawn from contact with said aqueous solution, reacting the hydrochloric and nitric acids in said solution with an alkali metal base, thereby increasing the amount of alkali metal chloride and nitrate in the solution, and recovering solid alkali metal chloride and nitrate from the thus treated solution.

6. The process for the treatment of a gas containing nitrosyl chloride and chlorine which comprises first removing the chlorine from said gas, circulating an aqueous solution saturated at about 30° C. to about 80° C. with an alkali metal chloride and nitrate in a cyclic system in which said solution is passed in contact with the nitrosyl chloride from which the chlorine has been separated at a temperature of about 30° C. to about 80° C. in amount sufficient to substantially completely decompose the nitrosyl chloride with the production of a solution containing hydrochloric and nitric acids and water in a proportion so correlated with the temperature at which the nitrosyl chloride and liquor are contacted that at about 80° C. the acidity of the resulting solution is not in excess of 6–N and at about 30° C. the acidity of the resulting solution is not in excess of 8–N, and of nitric oxide gas which is withdrawn from contact with the solution reacting the hydrochloric and nitric acids in said solution with an alkali metal base, thereby increasing the amount of alkali metal chloride and nitrate in the solution and crystallizing from the solution solid alkali metal chloride and nitrate, separating the crystallized solid from the mother liquor and returning the mother liquor into contact with said nitrosyl chloride.

7. In a process for the production of a nitrate and chlorine in which a metal chloride and nitric acid are reacted to form a nitrate and a gas mixture containing nitrosyl chloride and chlorine and the nitrosyl chloride is separated from the chlorine, that improvement which comprises passing said nitrosyl chloride in contact with an aqueous solution of metal chloride and nitrate to form nitric oxide gas which is withdrawn from contact with said aqueous solution and a solution of hydrochloric and nitric acids, neutralizing the resulting acid solution by means of an inorganic basic compound of a metal to form the corresponding metal chloride and metal nitrate and reacting the thus formed chloride with nitric acid to form nitrosyl chloride and chlorine.

8. In a process for the production of a nitrate and chlorine in which a metal chloride and nitric acid are reacted to form a nitrate and a gas mixture containing nitrosyl chloride and chlorine and the nitrosyl chloride is separated from the chlorine, that improvement which comprises passing said nitrosyl chloride in contact with a concentrated aqueous solution of a nitrate and a chloride of the same metal as that in the aforesaid metal chloride to form nitric oxide gas which is withdrawn from contact with said aqueous solution and a solution of hydrochloric and nitric acids, neutralizing the resulting acid solution by means of an inorganic basic compound of the same metal as that in the aforesaid metal chloride to crystallize from the solution solid chloride and nitrate, and reacting the thus formed chloride with nitric acid together with the first mentioned chloride.

9. In a process for the production of a nitrate and chlorine in which a metal chloride and nitric acid are reacted to form a nitrate and a gas mixture containing nitrosyl chloride and chlorine and the nitrosyl chloride is separated from the chlorine, that improvement which comprises passing said nitrosyl chloride in contact with an aqueous solution saturated at about 30° C. to about 80° C. with said chloride and nitrate in a cyclic system at a temperature of about 30° C. to about 80° C. in amount sufficient to substantially completely decompose the nitrosyl chloride with the production of a solution containing hydrochloric and nitric acids and water in a proportion so correlated with the temperature at which the nitrosyl chloride and liquor are contacted that at about 80° C. the acidity of the resulting solution is not in excess of 6–N and at about 30° C. the acidity of the resulting solution is not in excess of 8–N, and of nitric oxide gas which is withdrawn from contact with the solution, reacting the acids in the solution with an inorganic basic compound of the same cation as that of the aforesaid chloride and nitrate, thereby increasing the amount of nitrate and chloride in the solution and causing solid nitrate and chloride to crystallize from the solution, separating the crystallized solid from the mother liquor, returning the mother liquor into contact with said nitrosyl chloride and introducing said crystallized solid into a reaction mixture of metal chloride and nitric acid which is treated to form the first mentioned nitrate and said gas mixture containing nitrosyl chloride and chlorine.

10. In a process for the production of a nitrate and chlorine in which an alkali metal chloride and nitric acid are reacted to form a nitrate and a gas mixture containing nitrosyl chloride and chlorine and the nitrosyl chloride is separated from the chlorine, that improvement which comprises passing said nitrosyl chloride at a temperature of about 30° C. to about 80° C. in contact with a substantially neutral aqueous solution of a nitrate and a chloride of an alkali metal, said solution being contacted with the nitrosyl chloride in amount sufficient to decompose substantially completely the nitrosyl chloride forming a solution of hydrochloric and nitric acids containing a proportion of acid and water not in excess of that corresponding to about a 2–N acid solution and nitric oxide gas which is withdrawn from contact with said aqueous solution, introducing an alkali metal base into the resulting acid solution to react with acid contained therein, recovering as solid salts the alkali metal chloride and nitrate thus formed and introducing said solid alkali metal chloride and nitrate into a reaction mixture of alkali metal chloride and nitric acid which is treated to form the first mentioned nitrate and said gas mixture containing nitrosyl chloride and chlorine.

11. In a process for the production of a nitrate and chlorine in which a metal chloride and nitric acid are reacted to form a nitrate and a gas mixture containing nitrosyl chloride and chlorine and the nitrosyl chloride is separated from the chlorine, that improvement which comprises passing said nitrosyl chloride in contact with an aqueous solution of sodium nitrate and sodium chloride to decompose the nitrosyl chloride forming hydrochloric and nitric acids which are dissolved in said aqueous solution and nitric oxide gas which is withdrawn from contact with said aqueous solution, introducing sodium carbonate into the resulting acid solution, recovering as solid salts the sodium chloride and nitrate thus formed and introducing said solid sodium chloride and nitrate into a reaction mixture of sodium chloride and nitric acid which is treated to form the first mentioned sodium nitrate and said gas mixture containing nitrosyl chloride and chlorine.

12. In a process for the production of a nitrate and chlorine in which a metal chloride and nitric acid are reacted to form a nitrate and a gas mixture containing nitrosyl chloride and chlorine and the nitrosyl chloride is separated from the chlorine, that improvement which comprises passing said nitrosyl chloride in contact with a substantially neutral aqueous solution saturated at a temperature of about 30° C. to 80° C. with sodium nitrate and sodium chloride, said solution being contacted with the nitrosyl chloride in amount sufficient to decompose substantially completely the nitrosyl chloride forming a solution of hydrochloric and nitric acids containing a proportion of acid and water not in excess of that corresponding to about a 2–N acid solution and nitric oxide gas which is withdrawn from contact with said aqueous solution, introducing sodium carbonate into the resulting acid solution to react with acid contained therein, recovering as solid salts the sodium chloride and nitrate thus formed and introducing said solid sodium chloride and nitrate into a reaction mixture of sodium chloride and nitric acid which is treated to form the first mentioned sodium nitrate and said gas mixture containing nitrosyl chloride and chlorine.

13. In a process for the production of a nitrate and chlorine in which a metal chloride and nitric acid are reacted to form a nitrate and a gas mixture containing nitrosyl chloride and chlorine and the nitrosyl chloride is separated from the chlorine, that improvement which comprises passing said nitrosyl chloride in contact with an aqueous solution of a chloride and a nitrate of the same metal as that in the aforesaid metal chloride to form nitric oxide gas which is withdrawn from contact with said aqueous solution, neutralizing the acid solution resulting from the reaction of said nitrosyl chloride and aqueous liquor with a basic compound of the same metal as that in the aforesaid metal chloride, recovering as solid the chloride and nitrate formed by reaction of said acids and base, and returning said chloride and nitrate for reaction with nitric acid formed by reaction of the aforesaid nitric oxide and with additional chloride and nitric acid to form a nitrate, nitrosyl chloride and chlorine.

14. The process for the treatment of a gas containing nitrosyl chloride and chlorine which comprises first removing the chlorine from said gas and then introducing the nitrosyl chloride from which the chlorine has been separated into contact with a concentrated aqueous solution of an inorganic nitrate and chloride of the group consisting of the alkali and alkaline earth nitrates and chlorides to decompose the nitrosyl chloride forming hydrochloric and nitric acids which are dissolved in said aqueous solution and nitric oxide gas which is withdrawn from contact with said aqueous solution, introducing a base from the group consisting of the hydroxides and carbonates of the alkali and alkaline earth metals and the oxides of the alkaline earth metals into the resulting acid solution to react with acid contained therein, and recovering solid chloride and nitrate from the thus treated solution.

15. The process for the treatment of a gas containing nitrosyl chloride and chlorine which comprises first removing the chlorine from said gas, repeatedly circulating an aqueous liquor through a plurality of stages, first through one of said stages wherein said liquor which, when acidic, contains a proportion of acid and water not in excess of that corresponding to a 3–N acid solution, is introduced into contact with the nitrosyl chloride from which the chlorine has been separated and is intimately contacted in countercurrent flow therewith in amount sufficient to decompose substantially completely the nitrosyl chloride to form nitric oxide gas and nitric and hydrochloric acids, said nitric oxide gas being withdrawn from contact with said liquor and said nitric and hydrochloric acids being absorbed therein with the formation of a solution in which the proportion of acid and water is so correlated with the temperature at which the nitrosyl chloride and liquor are contacted that at about 80° C. the acidity of the resulting solution is not in excess of 6–N and at about 30° C. the acidity of the resulting solution is not in excess of 8–N, passing the resulting liquor through a second stage in which an alkaline material from the group consisting of the hydroxides and carbonates of the alkali and alkaline earth metals and the oxides of the alkaline earth metals is added to the liquor to react with acid contained therein in amount sufficient to decrease the proportion of acid and water left in the thus treated liquor at least to that corresponding to a 3–N acid solution, recovering from the thus treated liquor solid salts formed by reaction of the alkaline material and acids in said liquor, and recirculating liquor from which solid salts have been recovered and containing dissolved chloride and nitrate into renewed contact with said nitrosyl chloride in the first mentioned stage.

16. The process for the treatment of a gas containing nitrosyl chloride and chlorine which comprises first removing the chlorine from said gas, circulating a concentrated aqueous solution of a chloride and nitrate of the group consisting of the alkali and alkaline earth nitrates and chlorides in a cyclic system in which said solution is passed in contact with the nitrosyl chloride from which the chlorine has been separated to decompose the nitrosyl chloride forming nitric oxide gas which is withdrawn from contact with the solution and hydrochloric and nitric acids which are dissolved in the solution, introducing into the resulting acid solution a base from the group consisting of the hydroxides and carbonates of the alkali and alkaline earth metals and the oxides of the alkaline earth metals and containing the same cation as that of the aforesaid chloride and nitrate, to react with acid contained therein and to crystallize from the solution solid chloride and nitrate, separating the crystallized solid from the mother liquor and returning the mother liquor into contact with said nitrosyl chloride.

17. In a process for the production of a nitrate and chlorine in which a metal chloride and nitric acid are reacted to form a nitrate and a gas mixture containing nitrosyl chloride and chlorine and the nitrosyl chloride is separated from the chlorine, that improvement which comprises passing said nitrosyl chloride in contact with an aqueous solution of a nitrate and chloride of the group consisting of the alkali and alkaline earth nitrates and chlorides to form nitric oxide gas which is withdrawn from contact with said aqueous solution and a solution of hydrochloric and nitric acids, neutralizing the resulting acid solution by means of a base from the group consisting of the hydroxides and carbonates of the alkali and alkaline earth metals and the oxides of the alkaline earth metals and reacting the thus formed chloride with nitric acid to form nitrosyl chloride and chlorine.

18. In a process for the production of a nitrate and chlorine in which a metal chloride from the group consisting of the chlorides of the alkali and alkaline earth metals and nitric acid are reacted to form a nitrate and a gas mixture containing nitrosyl chloride and chlorine and the nitrosyl chloride is separated from the chlorine, that improvement which comprises passing said nitrosyl chloride in contact with a concentrated aqueous solution of a nitrate and a chloride of the same metal as that of the aforesaid metal chloride to form nitric oxide gas which is withdrawn from contact with said aqueous solution and a solution of hydrochloric and nitric acids, neutralizing the resulting acid solution by means of an inorganic basic compound of the same metal as that in the first mentioned metal chloride to crystallize from the solution solid chloride and nitrate, and reacting the thus formed chloride with nitric acid together with the first mentioned chloride.

19. In a process for the production of a nitrate and chlorine in which a metal chloride of the group consisting of the alkali and alkaline earth chlorides and nitric acid are reacted to form a nitrate and a gas mixture containing nitrosyl chloride and chlorine and the nitrosyl chloride is separated from the chlorine, that improvement which comprises passing said nitrosyl chloride in contact with an aqueous solution saturated at about 30° C. to about 80° C. with a chloride and nitrate of the group consisting of the alkali and alkaline earth nitrates and chlorides in a cyclic system at a temperature of about 30° C. to about 80° C. in amount sufficient to substantially completely decompose the nitrosyl chloride with the production of a solution containing hydrochloric and nitric acids and water in a proportion so correlated with the temperature at which the nitrosyl chloride and liquor are contacted that at about 80° C. the acidity of the resulting solution is not in excess of 6–N and at about 30° C. the acidity of the resulting solution is not in excess of 8–N and of nitric oxide gas which is withdrawn from contact with the solution, introducing a base from the group consisting of the hydroxides and carbonates of the alkali and alkaline earth metals and the oxides of the alkaline earth metals into the resulting acid solution to react with acid contained therein and to crystallize from the solution solid chloride and nitrate, separating the crystallized solid from the mother liquor, returning the mother liquor into contact with said nitrosyl chloride and introducing said crystallized solid into the reaction mixture of metal chloride and nitric acid which is treated to form the first mentioned nitrate and said gas mixture containing nitrosyl chloride and chlorine.

20. In a process for the production of a nitrate and chlorine in which a metal chloride and nitric acid are reacted to form a nitrate and a gas mixture containing nitrosyl chloride and chlorine and the nitrosyl chloride is separated from the chlorine, that improvement which comprises passing said nitrosyl chloride in contact with an aqueous solution of a nitrate and a chloride of the group consisting of the alkali and alkaline earth nitrates and chlorides to form nitric oxide gas which is withdrawn from contact with said aqueous solution and a solution of hydrochloric and nitric acids, neutralizing the resulting acid solution by means of a base from the group consisting of the hydroxides and carbonates of the alkali and alkaline earth metals and the oxides of the alkaline earth metals and returning the thus formed chloride and nitrate for reaction of the chloride with nitric acid to form nitrosyl chloride and chlorine in the presence of the returned nitrate.

21. In a process for the production of a nitrate and chlorine in which a metal chloride and nitric acid are reacted to form a nitrate and a gas mixture containing nitrosyl chloride and chlorine and the nitrosyl chloride is separated from the chlorine, that improvement which comprises passing said nitrosyl chloride in contact with a concentrated aqueous solution of a nitrate and a chloride of the group consisting of the alkali and alkaline earth nitrates and chlorides to form nitric oxide gas which is withdrawn from contact with said aqueous solution and a solution of hydrochloric and nitric acids, neutralizing the resulting acid solution by means of a basic compound of a metal from the group consisting of the alkali and alkaline earth metals to crystallize from the solution solid chloride and nitrate, separating the crystallized solids from the solution, returning the thus formed chloride and nitrate for reaction of the chloride together with the first mentioned chloride with nitric acid in the presence of the returned nitrate and recycling the solution from which the crystallized solids have been separated into contact with the aforesaid nitrosyl chloride.

22. The process for the decomposition of nitrosyl chloride which comprises repeatedly circulating a concentrated aqueous solution of an inorganic nitrate and chloride through a plurality of stages, first through one of said stages wherein said solution is intimately contacted with a gas containing nitrosyl chloride and substantially free from chlorine to decompose the nitrosyl chloride forming hydrochloric and nitric acids which are dissolved in said aqueous solution and nitric oxide gas which is withdrawn from contact with said aqueous solution, and next through a second of said stages in which the acids in the solution are reacted with an inorganic base, thereby increasing the amount of nitrate and chloride in the solution, recovering solid chloride and nitrate from the solution, and then recirculating thus treated solution through the first mentioned stage.

23. The process for the treatment of a gas containing nitrosyl chloride and chlorine which comprises first removing the chlorine from said gas and then introducing the nitrosyl chloride from which the chlorine has been separated into contact with a concentrated aqueous solution of an inorganic nitrate and chloride to decompose the nitrosyl chloride forming hydrochloric and nitric acids which are dissolved in said aqueous solution and nitric oxide gas which is withdrawn from contact with said aqueous solution, reacting the acids in the solution with an inorganic base thereby increasing the amount of nitrate and chloride in the solution and recovering solid chloride and nitrate from the thus treated solution.

FRANK OSCAR AGEL.